Jan. 27, 1959   R. W. BUNTENBACH   2,871,400
HIGH-SPEED MULTIPLE-EXPOSURE PHOTOGRAPHIC APPARATUS
Filed Dec. 12, 1955   2 Sheets-Sheet 1

INVENTOR.
Rudolph W. Buntenbach
BY Lippincott and Smith
Attorneys

United States Patent Office 2,871,400
Patented Jan. 27, 1959

2,871,400

HIGH-SPEED MULTIPLE-EXPOSURE PHOTOGRAPHIC APPARATUS

Rudolph W. Buntenbach, Lafayette, Calif., assignor, by mesne assignments, to the United States of America as represented by the United States Atomic Energy Commission Application December 12, 1955, Serial No. 552,411

6 Claims. (Cl. 315—10)

This invention relates to photographic apparatus for making a plurality of photographic exposures in rapid succession upon different portions of a single frame of photographic film, and in particular to improved electronic image-deflection means for deflecting the images to be photographed sequentially to a plurality of positions.

It is known that image-converter tubes may be used as high-speed photographic shutters providing extremely short exposure times for photographing rapidly changing events. It is sometimes desirable to make a plurality of successive exposures of such an event at time intervals too short to permit moving or changing the photographic film or plate between exposures, and to make a separate photograph of the event at each exposure for displaying the changes that occur. This can be accomplished by deflecting successive images of the event to a plurality of different positions on the photographic film. Accordingly, an object of this invention is to provide, in combination with an image-converter tube, improved image deflecting means for deflecting the image to a plurality of successive positions. Another object is to provide an improved waveform generator for providing high-speed deflection signals. Other objects and advantages will appear as the description proceeds.

Briefly stated, in accordance with one aspect of this invention, an image converter tube is provided with two pair of deflection coils for deflecting the image in two mutually perpendicular directions. Alternatively, electrostatic deflection means may be used in place of deflection coils. Electric deflection signals having waveforms consisting of positive and negative substantially rectangular pulses are supplied to the deflection coils so that successive images are deflected to different positions, and remain stationary in each of such positions for a brief time interval. The image-converter tube, which is normally "cut off" by a negative bias voltage, receives a positive electric pulse during each such time interval to provide a photographic exposure.

The deflection signals are supplied by two flying-spot waveform generators each consisting of a cathode-ray tube, a mask having an edge corresponding in contour to the waveform that is to be generated, and a photoelecteric system for maintaining a luminous spot on the face of the cathode-ray tube alined with the edge of the mask. A sweep signal is supplied simultaneously to the two waveform generators to generate two deflection signals. For increasing the operating speed of the flying-spot waveform generators, only ultraviolet light emitted by the cathode-ray tube is utilized to control the photoelectric system, according to the principles disclosed and claimed in my concurrently filed U. S. patent application Serial No. 552,410, entitled "Electric Pulse Generator" and assigned to the same assignee as the present patent application.

The invention will be better understood from the following description taken in connection with the accompanying drawings, and its scope will be pointed out in the appended claims. In the drawings, Fig. 1 is a schematic diagram of high-speed photographic apparatus embodying principles of this invention;

Figure 1:
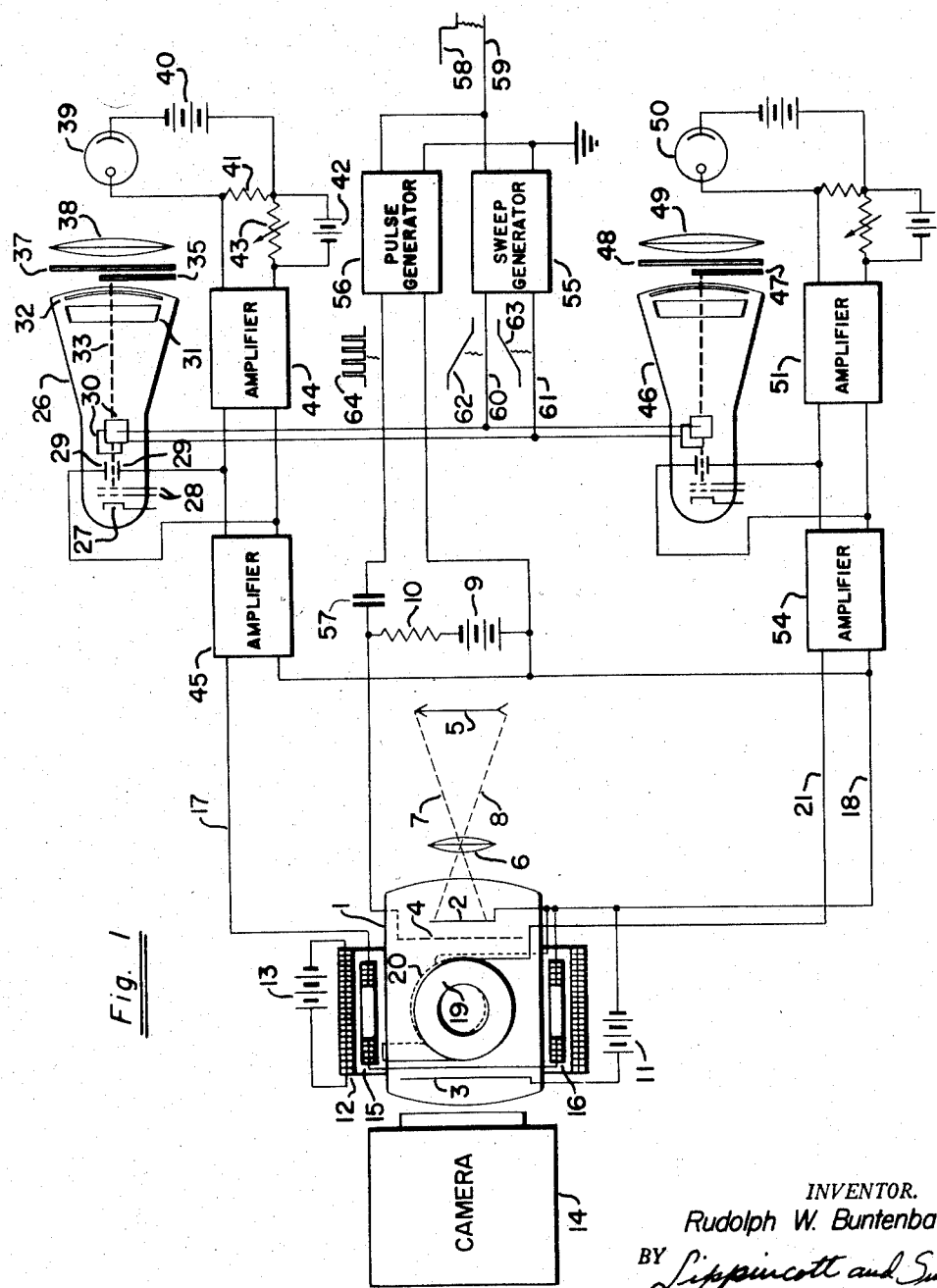

Referring now to Fig. 1 of the drawing, a conventional image-converter tube has an evacuated envelope 1 containing a photoemissive cathode 2, a cathodoluminescent anode 3, and a control grid 4 positioned between cathode 2 and anode 3. The event to be photographed is represented by arrow 5, which may change rapidly in position, shape, or luminosity. An image of event 5 is focused on cathode 2 by a lens system 6. Broken lines 7 and 8 represent typical light rays between the event to be photographed and the photoemissive cathode.

Illuminated portions of cathode 2 emit electrons that form an electron image of event 5. Normally these electrons are prevented from traveling down the length of the image-converter tube by a negative bias voltage applied between control grid 4 and cathode 2 by any suitable biasing means such as a battery 9 connected in series to a resistor 10. When a positive voltage pulse is applied between the control grid and the cathode, by means hereinafter described, electrons emitted by cathode 2 are attracted to anode 3 by a positive voltage applied between the anode and the cathod by suitable means, such as battery 11. For focusing the electron image on cathode 3, a longitudinal magnetic field may be provided by suitable means such as a focusing coil 12 that is continuously supplied with electric current, by a battery 13, for example.

Portions of the anode 3 that are bombarded by electrons emit light that forms an optical image which may be photographed by a camera 14. Consequently, the image-converter tube is in effect an electro-optical shutter for the camera, and the effective exposure time is controlled by the duration of the positive voltage pulse supplied to control grid 4. With this arrangement, very short exposure times can be obtained, as is well known to those skilled in the art.

A pair of deflection coils 15 and 16 are arranged to provide a vertical component of magnetic field through the image-converter tube, and this vertical field deflects the electron image horizontally to different positions on anode 3. Preferably coils 15 and 16 are connected in series, as shown, between a pair of leads 17 and 18. Lead 18 may be connected to ground or its circuit equivalent. Another pair of deflection coils 19 and 20 are arranged to provide through the image-converter tube a horizontal component of magnetic field that deflects the electron image vertically to different positions on anode 3. Preferably coils 19 and 20 are connected in series between a pair of leads 21 and 18.

By applying deflection currents of appropriate waveforms to the two pairs of deflection coils, the electron image can be deflected to a plurality of successive positions on anode 3, and for each of these positions a positive voltage pulse is applied to control grid 4 to provide a plurality of separate successive optical images at the anode of the image-converter tube. All of these images are photographed by camera 14 so that the separate images appear on different parts of a single photographic plate or frame. Preferably the deflection signals have waveforms consisting of successive positive and negative substantially rectangular pulses, so that the images are substantially stationary on the anode 3 during each exposure interval.

Figure 2:
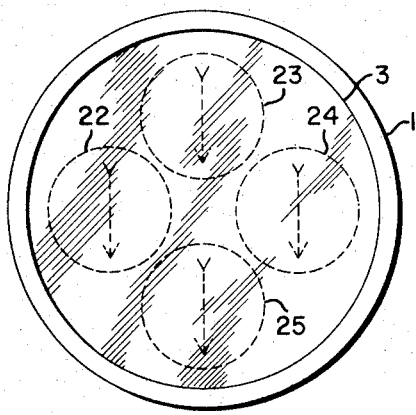
Fig. 2 is an end view of an image-converter tube used in the apparatus of Fig. 1, showing four different image positions.

Fig. 2 is an end view of the image-converter tube that illustrates the positions of four separate images formed at anode 3, the four image positions being indicated by broken-line circles 22, 23, 24 and 25. Assume, for example, that a negative deflection current is applied through lead 17 to coils 15 and 16, thereby providing an upward component of magnetic field through the image-converter tube. As a result of the deflection current, when a positive voltage pulse is applied to control grid 4 to permit the transmission of electrons along the length of the converter tube, the electron image is deflected toward the left by the magnetic field produced by current in the deflection coils to provide an image of event 5 on anode 3 at the position indicated in Fig. 2 by broken-line circle 22.

Now assume that the current through coils 15 and 16 is reduced to zero, while a positive deflection current is applied through lead 21 to coils 19 and 20, thereby providing a magnetic field component passing from left to right through the image-converter tube. Now the electron image is deflected upward when the next positive voltage pulse is applied to grid 4, and an image of event 5 is formed on anode 3 at the position indicated in Fig. 2 by broken-line circle 23.

Next assume that the current through coils 19 and 20 is reduced to zero while a positive deflection current is supplied through lead 17 to coils 15 and 16 during the interval when the next positive voltage pulse is applied to control grid 4. Now an image of event 5 is formed on the anode 3 at the position indicated in Fig. 2 by broken-line circle 24.

Now assume that the current through the coils 15 and 16 is reduced to zero, while a negative deflection current is supplied through lead 21 to coils 19 and 20 during the interval when the next positive pulse is applied to control grid 4. A magnetic field component is provided from right to left through the image-converter tube that deflects the electron image downward so that an image is formed on anode 3 at the position indicated in Fig. 2 by broken line circle 25. Accordingly, four separate images are formed successively on different parts of anode 3, and these four images are reproduced on different portions of the photographic film or plate within camera 14.

Although the image converter tube herein described has magnetic electron deflection means for deflecting images to different portions of the anode, tubes having electrostatic electron deflection means for deflecting the images may also be used.

Figure 3:
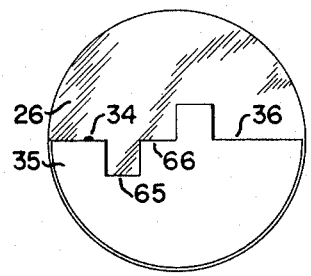
Fig. 3 is an end view of a cathode-ray tube used in the Fig. 1 apparatus, showing one of the waveform generator masks.

The deflection signals preferably are generated by two flying-spot waveform generators that will now be described. One waveform generator includes the cathode-ray tube of a conventional type used in cathode-ray oscillographs, which comprises an evacuated envelope 26 containing a cathode 27, a plurality of accelerating and focusing electrodes 28, a pair of deflection plates 29, another pair of deflection plates 30, a collector electrode 31 and a cathodoluminescent screen 32. Cathode 27 and electrodes 28 constitute a conventional electron gun supplying a focused electron beam 33 that bombards a small portion of screen 32 to produce a small luminous spot 34 on the face of the cathode-ray tube, as is shown in Fig. 3.

Spot 34 can be moved to different parts of the screen 32 by deflection voltages supplied to deflecting plates 29 and 30 in a manner hereinafter described. Voltages supplied to the two pairs of deflection plates deflect electron beam 33 in two mutually perpendicular directions—vertically and horizontally, for example. Preferably screen 32 consists of a phosphor coated on the face of envelope 26 that emits ultraviolet light when excited by electron bombardment. For example, a phosphor of the type known to those skilled in the art as "P15" may advantageously be employed. In addition to the ultraviolet light emitted, such a phosphor generally also emits visible light, but for reasons hereinafter explained only the ultraviolet light is utilized.

An opaque mask 35 is positioned in front of and obscures a portion of screen 32. One edge 36 of mask 35 extends from one side to the other of screen 32, and corresponds in contour to the waveform that is to be generated, as is best shown in Fig. 3. Ultraviolet light emitted by the unobscured portions of screen 32 passes through a filter 37 that transmits ultraviolet light but is substantially opaque to visible light. The ultraviolet light transmitted by filter 37 is focused by a lens system 38 onto the cathode of a phototube 39 or other photoelectric transducer.

Operating voltage is supplied to phototube 39 by suitable means such as a battery 40, and the phototube supplies across a load resistor 41 an electric signal having an amplitude proportional to the amount of ultraviolet light that illuminates the phototube cathode. A bias voltage, supplied by suitable means such as a battery 42 and a resistor 43, opposes the voltage across resistor 41. The difference between these two voltages is amplified by a conventional voltage amplifier 44 and is applied across the vertical deflection plates 29 of the cathode-ray tube.

Assume, for example, that luminous spot 34 is well above the upper edge 36 of mask 35. A relatively large proportion of the ultraviolet light emitted by spot 34 reaches phototube 39; and consequently a relatively large positive voltage appears across resistor 41. This voltage is larger than the negative voltage across resistor 43, and the positive voltage difference is amplified by amplifier 44 and supplied to deflection plates 29 to deflect electron beam 33 downward and move luminous spot 34 toward mask 35.

As spot 34 begins to cross the upper edge 36 of the mask, part of the ultraviolet light emitted by the spot is obscured, so that the illumination of phototube 39 is reduced. Accordingly, the positive voltage across resistor 41 is reduced and so is deflection voltage applied between deflecting plates 29.

If spot 34 moves downward sufficiently for the major portion of the emitted light to be obscured by mask 35, the voltage across resistor 41 becomes less than the negative bias voltage across resistor 43, and a negative voltage is supplied between plates 29 that deflects beam 33 upward. Consequently spot 34 is always moved toward an equilibrium position in which the spot is positioned on edge 36 of the mask, and in which the amount of ultraviolet light that reaches phototube 39 is just sufficient to provide a deflecting voltage that keeps the spot in this position. Thus a photoelectric control system is provided that always automatically positions luminous spot 34 on the upper edge 36 of mask 35.

The upper edge 36 of mask 35 has a contour that corresponds to the electric waveform that is being generated. When the generation of this waveform is desired, a sawtooth waveform sweep voltage is applied between deflecting plates 30 that moves spot 34 at a substantially constant speed from left to right across screen 32. As the luminous spot moves from left to right across the screen, the photoelectric system supplies between deflecting plates 29 a voltage just sufficient to keep spot 34 positioned on edge 36 of mask 35. Since the vertical deflection of beam 33 is a function of the amplitude and polarity of the deflecting voltage supplied between deflecting plates 29, this voltage has a waveform corresponding substantially to the contour of the upper edge 36 of mask 35. A conventional current amplifier 45 supplies a current of similar waveform through lead 17 to deflecting coils 15 and 16 of the image converter tube.

The speed of operation of the waveform generator just described, and therefore the rise and decay slopes of the rectangular waveform electric pulses, is chiefly limited by the persistence of the phosphor used in cathodoluminescent screen 32. Since the persistence of most phosphors is very much less with respect to ultraviolet light emitted by the phosphor than it is with respect to visible light emitted by the phosphors, much faster operating speeds are obtained by using only the ultraviolet light to operate the photoelectric system. For example, after electron bombardment of a given spot on the screen is terminated, a P15 phosphor continues to emit visible light with a decay time in the order of 0.4 to 1.5 microseconds, while the ultraviolet light emitted by the same spot persists with a decay time of about 0.05 microsecond. It is thus apparent that a photoelectric system utilizing the ultraviolet light only can keep the luminous spot positioned on the edge of the mask with much faster horizontal sweep velocities than would be possible with a photoelectric system utilizing visible light emitted by the luminous spot.

Figure 4:
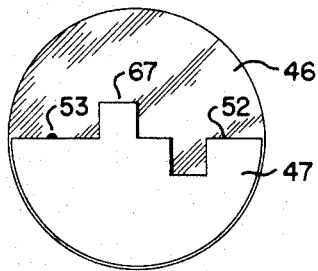
Fig. 4 is an end view of another cathode-ray tube used in the Fig. 1 apparatus, showing a second waveform generator mask.

A similar waveform generator comprises a cathode-ray tube 46, an opaque mask 47, a filter 48, a lens system 49, a photoelectric transducer 50, and a voltage amplifier 51. The two waveform generators may be identical, except that the upper edge 52 of opaque mask 47, shown in Fig. 4, has a contour different from that of the upper edge 36 of the opaque mask 45, so that deflection signals having different waveforms are provided by the two waveform generators. The same sweep voltages are supplied to the two waveform generators simultaneously, so that luminous spot 53, shown in Fig. 4, moves along edge 52 at the same time and with the same horizontal velocity as luminous spot 34 moves along edge 36. As spot 53 moves from left to right across the face of tube 46, photoelectric transducer 50 and amplifier 51 supply to tube 46 a vertical deflection voltage that has a waveform substantially corresponding to the contour of edge 52. Amplifier 54 supplies a current having a similar waveform through lead 21 to deflection coils 19 and 20 of the image-converter tube.

Horizontal sweep voltages for the two waveform generators are supplied by a sweep generator 55, while positive voltage pulses are supplied by a pulse generator 56, through a capacitor 57, to control grid 4 of the image-converter tube. Operation of photographic apparatus is started by supplying a voltage pulse or step 58 to the input lead 59 of sweep generator 55 and pulse generator 56. Any suitable timing or switching means may be used to generate the impulse 58 whenever it is desired that a photographic operation be initiated. In response to impulse 58, sweep generator 55 provides through leads 60 and 61 conventional sawtooth waveform sweep voltages 62 and 63, of opposite polarity. These sweep voltages are applied to the horizontal deflecting plates of the waveform generator tubes, and cause luminous spots 34 and 53 to move simultaneously from left to right across the faces of cathode-ray tubes 26 and 46. Impulse 58 also triggers pulse generator 56, which thereupon produces a train 64 of four positive voltage pulses that are applied to control grid 4 of the image-converter tube to provide four successive exposures of event 5.

As luminous spots 34 and 53 begin to move from left to right, spot 34 follows edge 36 to produce a negative substantially rectangular pulse having a horizontal bottom 65. This provides a negative deflecting current through lead 17, and at this time the first pulse of train 64 is supplied to grid 4 and an image is produced at 22 on the anode of the image-converter tube. As spots 34 and 53 continue traveling to the right, spot 34 returns to a neutral portion 66 of edge 36, while spot 53 rises to the horizontal plateau 67 of edge 52. This provides a positive deflection current through lead 21, and at this time the second pulse of train 64 is applied to grid 4 and the second image of event 5 is produced at 23 on the anode of the image-converter tube.

As spots 34 and 53 continue to travel toward the right, the current through lead 21 returns to zero while a positive current pulse is provided through lead 17. At this time the third positive voltage pulse of train 64 is applied to grid 4, and a third image of event 5 is provided at 24 on the anode of the image-converter tube. During the next time interval a negative current pulse is supplied through lead 21 while the fourth positive voltage pulse of train 64 is supplied to grid 4, and a fourth image of event 5 is provided at 25 on the anode of the image-converter tube. In this way four separate images of event 5 are produced in rapid succession, so that changes in a very rapidly changing event can be displayed. All four of these images are recorded on photographic film by camera 14, although they might be observed visually, particularly if anode 3 comprises a phosphor having a fairly long persistence.

Sweep generator 55 may be any of numerous known sawtooth waveform generators that can be triggered by an electric impulse, and pulse generator 56 may be any of numerous devices for producing trains of pulses in timed sequence after a triggering impulse. For example, triggering impulse 58 may be transmitted through four different delay circuits to provide four triggering impulses to a blocking oscillator or other pulse-producing device. The amplifiers, phototubes, cathode-ray tubes, image-converter tube and camera are devices of well known conventional types, and any further description thereof would be superfluous.

It should be understood that this invention in its broader aspects is not limited to specific embodiments herein illustrated and described, and that the following claims are intended to cover all changes and modifications that do not depart from the true spirit and scope of the invention.

What is claimed is:

1. High-speed multiple-exposure photographic apparatus comprising an image converter tube having a photoemissive cathode and a cathodoluminescent anode, means projecting an optical image on said photoemissive cathode, whereby said cathode emits electrons that travel to said anode and reproduce said optical image thereon, first electron-deflecting means for moving said reproduced image in one direction on said anode, second electron-deflecting means for moving said reproduced image in a second direction on said anode, a first waveform generator supplying to said first electron-deflecting means a first electric waveform consisting of successive positive and negative substantially rectangular pulses, a second waveform generator supplying to said second electron-deflecting means a second electric waveform consisting of successive positive and negative substantially rectangular pulses, whereby a plurality of optical images are reproduced successively on different portions of said anode, and means for photographing said images.

2. High-speed multiple-exposure photographic apparatus comprising an image converter tube for reproducing optical images, first image-deflecting means for deflecting the reproduced image in one direction, second image-deflection means for deflecting the reproduced image in a second direction perpendicular to said first direction, a first flying-spot waveform generator supplying to said first image-deflecting means a first electric waveform, and a second flying-spot waveform generator supplying to said second image-deflecting means a second electric waveform, each of said waveform generators comprising a cathodoluminescent screen, means bombarding a portion of said screen with an electron beam to produce a luminous spot, a mask obscuring a portion of said screen and having an edge similar in contour to the waveform that is to be generated, means deflecting said beam to move said spot lengthwise along said edge, photoelectric means converting light emitted by said screen into an electric signal, and means controlled by said signal for deflecting said beam to position said spot automatically on said edge.

3. High-speed multiple-exposure photographic apparatus comprising an image converter tube having an evacuated envelope containing a photoemissive cathode and a cathodoluminescent anode, means projecting an optical image upon said cathode, said cathode emitting electrons that travel to a portion of said anode and reproduce said optical image thereon, a first pair of deflection coils for deflecting said electrons to move said image in a first direction on said anode, a second pair of deflection coils for deflecting said electrons to move said image in a second direction on said anode, said second direction being perpendicular to said first direction, a first flying-spot waveform generator supplying to said first pair of coils a first electric current waveform consisting of successive positive and negative substantially rectangular pulses, a second flying-spot waveform generator supplying to said second pair of coils a second electric current waveform consisting of successive positive and negative substantially rectangular pulses, a grid between said cathode and said anode, means supplying a negative bias voltage between said grid and said cathode sufficient to cut off the flow of electrons between said cathode and said anode, means supplying a plurality of positive voltage pulses between said grid and said cathode at times synchronized with plateaus of the waveforms supplied to said coils, whereby a plurality of optical images are reproduced on different portions of said anode, and means photographing said images.

4. High-speed multiple-exposure photographic apparatus comprising means producing a luminous spot, a mask having an edge corresponding to a waveform of successive positive and negative pulses, means including a sweep generator to move said spot along the length of said edge, photoelectric means converting light from said spot into an electric signal, means controlled by said signal for automatically positioning said spot on said edge, an image converter for electronically transmitting optical images, deflection means controlled by said signal for deflecting the transmitted images to a plurality of different positions, means supplying a negative bias voltage to said image converter that normally prevents transmission of images, and means synchronized with said sweep generator to supply a positive pulse to said image converter for each of said image positions, whereby said image converter transmits a plurality of separate images, and means photographing said images.

5. Apparatus comprising an evacuated envelope containing a photoemissive cathode and a cathodoluminescent anode, means for projecting a time-varying optical image upon said cathode, said cathode emitting electrons in a time-varying pattern corresponding to said projected optical image, means for focussing said electrons upon said anode to reproduce said optical image at said anode, a control grid within said envelope between said cathode and said anode, means for providing between said grid and said cathode a negative bias voltage sufficient to cut off the flow of electrons between said cathode and said anode, means for supplying a plurality of sequential positive-going voltage pulses between said grid and said cathode in additive relation to said negative bias voltage to permit bursts of electron flow from said cathode to said anode, and means for deflecting each of said bursts of electron flow to a different portion of said anode so that a plurality of spatially separated reproductions of said projected optical image are produced at said anode, respective ones of said rerooductions corresonding to a plurality of temporally separated aspects of said projected optical image.

6. Apparatus as defined in claim 5, further characterized in that said means for deflecting said bursts comprises electron deflection means responsive to electric signals, and means for supplying to said electron deflection means stepwise time-varying electric signals having substantially constant values during each of said positive-going voltage pulses and changing in value between said pulses.

References Cited in the file of this patent

UNITED STATES PATENTS

| 2,144,337 | Koch | Jan. 17, 1939 |
| 2,489,883 | Hecht | Nov. 29, 1949 |
| 2,528,020 | Sunstein | Oct. 31, 1950 |
| 2,656,101 | Haviland | Oct. 20, 1953 |
| 2,692,300 | Hogan | Oct. 19, 1954 |
| 2,755,390 | Teichmann | July 17, 1956 |